United States Patent
Gu et al.

(10) Patent No.: US 12,378,908 B1
(45) Date of Patent: Aug. 5, 2025

(54) EXHAUST GAS TREATMENT SYSTEM AND MODEL FOR CONTROLLING HYDROCARBON ADSORPTION/DESORPTION IN HYDROCARBON TRAP

(71) Applicant: GM Global Technology Operations LLC, Detroit, MI (US)

(72) Inventors: Yuntao Gu, Farmington Hills, MI (US); Mingjie Tu, Sterling Heights, MI (US); Calvin Thomas, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/659,673

(22) Filed: May 9, 2024

(51) Int. Cl.
  *F01N 9/00* (2006.01)
  *F01N 3/20* (2006.01)
  *F01N 3/30* (2006.01)
  *F01N 13/00* (2010.01)

(52) U.S. Cl.
  CPC ............ *F01N 9/00* (2013.01); *F01N 3/2013* (2013.01); *F01N 3/30* (2013.01); *F01N 13/009* (2014.06); *F01N 2900/1602* (2013.01)

(58) Field of Classification Search
  CPC . F01N 9/00; F01N 3/2013; F01N 3/30; F01N 13/009; F01N 2900/1602
  See application file for complete search history.

(56) References Cited

U.S. PATENT DOCUMENTS

| | | | |
|---|---|---|---|
| 6,029,441 A | 2/2000 | Mizuno et al. | |
| 6,477,831 B1 * | 11/2002 | Ballinger | F01N 3/0807 60/284 |
| 7,121,087 B2 * | 10/2006 | Hotta | F01N 13/0097 60/309 |
| 10,794,256 B2 | 10/2020 | Bevan et al. | |
| 11,795,889 B2 | 10/2023 | Suzuki | |
| 11,802,502 B1 | 10/2023 | Szymkowicz et al. | |
| 2019/0353068 A1 | 11/2019 | Moser et al. | |
| 2023/0003152 A1 | 1/2023 | Clerc et al. | |

OTHER PUBLICATIONS

German Application No. 10 2024 117 667.9 filed Jun. 22, 2024; German Office Action dated Nov. 19, 2024; 4 pages.
Koltsakis et al. "Modeling of hydrocarbon trap systems." SAE Transactions (2000): 979-990.

* cited by examiner

*Primary Examiner* — Brandon D Lee
(74) *Attorney, Agent, or Firm* — CANTOR COLBURN LLP

(57) ABSTRACT

An exhaust gas treatment system including a hydrocarbon storage model; and a controller operably connected to the hydrocarbon storage model, the controller configured to execute a method for determining a hydrocarbon storage level of a hydrocarbon trap, the method comprising determining a first reaction rate representing a rate of hydrocarbon adsorption at non-acidic sites of the hydrocarbon trap; determining a second reaction rate representing a rate of hydrocarbon desorption at non-acidic sites of the hydrocarbon trap; determining a third reaction rate representing a rate of hydrocarbon adsorption at acidic sites of the hydrocarbon trap; determining a fourth reaction rate representing a rate of hydrocarbon desorption at acidic sites of the hydrocarbon trap; and determining the hydrocarbon storage level in the hydrocarbon trap based on the first reaction rate, the second reaction rate, the third reaction rate, and the fourth reaction rate.

16 Claims, 5 Drawing Sheets

EXHAUST GAS TREATMENT SYSTEM AND MODEL FOR CONTROLLING HYDROCARBON ADSORPTION/DESORPTION IN HYDROCARBON TRAP

INTRODUCTION

The subject disclosure relates to exhaust emission control systems for internal combustion engines and, more particularly, to the minimization of hydrocarbon emissions during the cold starting of engines.

Exhaust gas emitted from an internal combustion engine is a heterogeneous mixture that contains gaseous emissions such as carbon monoxide ("CO"), unburned hydrocarbons ("HC"), and oxides of nitrogen ("$NO_x$"). Many of these emission components are highly regulated. Catalyst components, typically disposed on catalyst supports or substrates, are provided in engine exhaust systems as part of an after-treatment system to convert certain, or all, of these exhaust constituents into non-regulated compounds.

An exhaust gas treatment system typically includes one or more catalyst-based treatment devices, such as a three-way catalyst (TWC). The objective of a catalyst such as a TWC is to convert the primary emissions from the engine into carbon dioxide, water, and nitrogen. For the catalyst or TWC to work as an effective catalyst for hydrocarbon oxidation, it is necessary to reach a high operating temperature, which may be difficult during cold-start operations. Therefore, hydrocarbon traps (HCTs) are commonly used to store hydrocarbons during cold start and release the hydrocarbons when the catalyst or TWC has reached a sufficient temperature. However, the HCT may reach a temperature at which it releases hydrocarbons before the catalyst or TWC has reached sufficient temperature for catalytic oxidation of the hydrocarbon species, leading to inefficient and/or insufficient hydrocarbon oxidation.

Accordingly, it is desirable to provide sufficient time for the catalyst or TWC to reach operating temperature before the bulk of hydrocarbon pollutants enter the catalytic system.

SUMMARY

An aspect provides an exhaust gas treatment system. The exhaust gas treatment system includes a first catalyst that is downstream of an exhaust gas outlet of an internal combustion engine, wherein the first catalyst receives an exhaust output from the exhaust gas outlet. A hydrocarbon trap is downstream of the first catalyst, wherein the hydrocarbon trap receives an exhaust output from the first catalyst. An air injection port is configured to deliver a stream of air upstream of the hydrocarbon trap and downstream of the first catalyst. An exhaust heating unit is downstream of the hydrocarbon trap, wherein the exhaust heating unit receives an exhaust output from the hydrocarbon trap. A second catalyst is downstream of the exhaust heating unit, wherein the second catalyst receives an exhaust output from the exhaust heating unit. The exhaust gas treatment system also includes a hydrocarbon storage model and a controller operably connected to the hydrocarbon storage model, wherein the controller is configured to execute a method for determining a hydrocarbon storage level of the hydrocarbon trap. The method for determining a hydrocarbon storage level of the hydrocarbon trap includes determining a first reaction rate representing a rate of hydrocarbon adsorption at non-acidic sites of the hydrocarbon trap, determining a second reaction rate representing a rate of hydrocarbon desorption at non-acidic sites of the hydrocarbon trap, determining a third reaction rate representing a rate of hydrocarbon adsorption at acidic sites of the hydrocarbon trap, and determining a fourth reaction rate representing a rate of hydrocarbon desorption at acidic sites of the hydrocarbon trap. The hydrocarbon storage level in the hydrocarbon trap is determined based on the first reaction rate, the second reaction rate, the third reaction rate, and the fourth reaction rate.

In another embodiment, the controller is further configured to adjust an after treatment operation on hydrocarbon released by the hydrocarbon trap based on the hydrocarbon storage level, a net reaction rate of hydrocarbon desorption from the hydrocarbon trap, or a combination thereof. The net reaction rate of hydrocarbon desorption from the hydrocarbon trap is determined based on the first reaction rate, the second reaction rate, the third reaction rate, and the fourth reaction rate.

In another embodiment, the step of adjusting the after treatment operation includes selectively operating the exhaust heating unit, selectively delivering a stream of air at the air injection port, or a combination thereof.

In another embodiment, the exhaust gas treatment system further includes a first temperature sensor for determining temperature of the hydrocarbon trap.

In another embodiment, the exhaust gas treatment system further includes a second temperature sensor for determining temperature of the second catalyst.

In another embodiment, the first reaction rate is represented by Equation 1:

$$r_{ads}[HC]\theta_Z A_{1_Z} \exp\left(\frac{Ea_Z}{-RT}\right) \quad \text{(Equation 1)}$$

the second reaction rate is represented by Equation 2:

$$r_{des} = \theta_{ZHC} A_{-1_Z} \exp\left(\frac{Ea_Z + \Delta H_Z}{-RT}\right) \quad \text{(Equation 2)}$$

the third reaction rate is represented by Equation 3:

$$r_{ads} = [HC]\theta_{ZH} A_{1_{ZH}} \exp\left(\frac{Ea_{ZH}}{-RT}\right) \quad \text{(Equation 3)}$$

the fourth reaction rate is represented by Equation 4:

$$r_{des} = \theta_{ZHHC} A_{-1_{ZH}} \exp\left(\frac{Ea_{ZH} + \Delta H_{ZH}}{-RT}\right) \quad \text{(Equation 4)}$$

wherein, in Equations 1 to 4, [HC] is a concentration of hydrocarbon through the hydrocarbon trap, $\theta_Z$ is site density of the non-acidic sites of the hydrocarbon trap that are not bound by hydrocarbon, $\theta_{ZHC}$ is site density of the non-acidic sites of the hydrocarbon trap that are bound by hydrocarbon, $\theta_{ZH}$ is site density of the acidic sites of the hydrocarbon trap that are not bound by hydrocarbon, $\theta_{ZHHC}$ is site density of the acidic sites of the hydrocarbon trap that are bound by hydrocarbon, $A_{1_Z}$ is a pre-exponential factor of the non-acidic sites of the hydrocarbon trap for hydrocarbon adsorption, $A_{-1_Z}$ is a pre-exponential factor of the non-acidic sites of the hydrocarbon trap for hydrocarbon desorption, $A_{1_{ZH}}$ is a pre-exponential factor of the acidic sites of the hydrocarbon trap for hydrocarbon adsorption, $A_{-1ZH}$ is a pre-exponential factor of the acidic sites of the hydrocarbon trap for hydrocarbon desorption, $Ea_z$ is activation energy of an adsorption reaction at the non-acidic sites of the hydrocarbon trap, $Ea_{zH}$ is activation energy of the adsorption reaction at the acidic sites of the hydrocarbon trap, $\Delta H_Z$ is heat of adsorption of hydrocarbon at the non-acidic sites of the hydrocarbon trap, $\Delta H_{ZH}$ is heat of adsorption of hydrocarbon at the acidic sites of the hydrocarbon trap, R is the universal gas constant, and T is the temperature.

In another embodiment, the exhaust heating unit is selectively operated when a net reaction rate of hydrocarbon desorption from the hydrocarbon trap is greater than zero, wherein the net reaction rate of hydrocarbon desorption from the hydrocarbon trap is determined based on the first reaction rate, the second reaction rate, the third reaction rate, and the fourth reaction rate.

In another embodiment, the stream of air is selectively delivered at the air injection port when a net reaction rate of hydrocarbon desorption from the hydrocarbon trap is greater than zero, wherein the net reaction rate of hydrocarbon desorption from the hydrocarbon trap is determined based on the first reaction rate, the second reaction rate, the third reaction rate, and the fourth reaction rate.

In another embodiment, a quantity of air delivered at the air injection port is proportional to a calculated deficiency of oxygen at the second catalyst.

Another aspect provides a method for treating an exhaust gas from an internal combustion engine in a motor vehicle. The method includes operating the internal combustion engine to provide an exhaust gas fluid at an exhaust gas outlet of the internal combustion engine; and conducting the exhaust gas fluid through an exhaust gas treatment system. The exhaust gas treatment system includes a first catalyst that is downstream of the exhaust gas outlet of the internal combustion engine, wherein the first catalyst receives an exhaust output from the exhaust gas outlet. The exhaust gas treatment system includes a hydrocarbon trap that is downstream of the first catalyst, wherein the hydrocarbon trap receives an exhaust output from the first catalyst. The exhaust gas treatment system includes an air injection port that is configured to deliver a stream of air upstream of the hydrocarbon trap and downstream of the first catalyst. The exhaust gas treatment system includes an exhaust heating unit that is downstream of the hydrocarbon trap, wherein the exhaust heating unit receives an exhaust output from the hydrocarbon trap. The exhaust gas treatment system includes a second catalyst that is downstream of the exhaust heating unit, wherein the second catalyst receives an exhaust output from the exhaust heating unit. The exhaust gas treatment system also includes a hydrocarbon storage model and a controller operably connected to the hydrocarbon storage model, wherein the controller is configured to execute a method for determining a hydrocarbon storage level of the hydrocarbon trap. The method further includes determining a first reaction rate representing a rate of hydrocarbon adsorption at non-acidic sites of the hydrocarbon trap, determining a second reaction rate representing a rate of hydrocarbon desorption at non-acidic sites of the hydrocarbon trap, determining a third reaction rate representing a rate of hydrocarbon adsorption at acidic sites of the hydrocarbon trap, and determining a fourth reaction rate representing a rate of hydrocarbon desorption at acidic sites of the hydrocarbon trap. The method further includes determining the hydrocarbon storage level in the hydrocarbon trap based on the first reaction rate, the second reaction rate, the third reaction rate, and the fourth reaction rate.

In another embodiment, the method further includes adjusting an after treatment operation on hydrocarbon released by the hydrocarbon trap based on the hydrocarbon storage level, a net reaction rate of hydrocarbon desorption from the hydrocarbon trap, or a combination thereof, wherein the net reaction rate of hydrocarbon desorption from the hydrocarbon trap is determined based on the first reaction rate, the second reaction rate, the third reaction rate, and the fourth reaction rate.

In another embodiment, the step of adjusting the after treatment operation includes selectively operating the exhaust heating unit, selectively delivering a stream of air at the air injection port, or a combination thereof.

In another embodiment, in the method for treating an exhaust gas from an internal combustion engine in a motor vehicle, the first reaction rate is represented by Equation 1:

$$r_{ads}[HC]\theta_Z A_{1Z}\exp\left(\frac{Ea_Z}{-RT}\right) \quad \text{(Equation 1)}$$

the second reaction rate is represented by Equation 2:

$$r_{des} = \theta_{ZHC} A_{-1Z}\exp\left(\frac{Ea_Z + \Delta H_Z}{-RT}\right) \quad \text{(Equation 2)}$$

the third reaction rate is represented by Equation 3:

$$r_{ads} = [HC]\theta_{ZH} A_{1ZH}\exp\left(\frac{Ea_{ZH}}{-RT}\right) \quad \text{(Equation 3)}$$

the fourth reaction rate is represented by Equation 4:

$$r_{des} = \theta_{ZHHC} A_{-1ZH}\exp\left(\frac{Ea_{ZH} + \Delta H_{ZH}}{-RT}\right) \quad \text{(Equation 4)}$$

wherein, in Equations 1 to 4, [HC] is a concentration of hydrocarbon through the hydrocarbon trap, $\theta_Z$ is site density of the non-acidic sites of the hydrocarbon trap that are not bound by hydrocarbon, $\theta_{ZHC}$ is site density of the non-acidic sites of the hydrocarbon trap that are bound by hydrocarbon, $\theta_{ZH}$ is site density of the acidic sites of the hydrocarbon trap that are not bound by hydrocarbon, $\theta_{ZHHC}$ is site density of the acidic sites of the hydrocarbon trap that are bound by hydrocarbon, $A_{1Z}$ is a pre-exponential factor of the non-acidic sites of the hydrocarbon trap for hydrocarbon adsorption, $A_{-1Z}$ is a pre-exponential factor of the non-acidic sites of the hydrocarbon trap for hydrocarbon desorption, $A_{1ZH}$ is a pre-exponential factor of the acidic sites of the hydrocarbon trap for hydrocarbon adsorption, $A_{-1ZH}$ is a pre-exponential factor of the acidic sites of the hydrocarbon trap for hydrocarbon desorption, $Ea_z$ is activation energy of an adsorption reaction at the non-acidic sites of the hydrocarbon trap, $Ea_{zH}$ is activation energy of the adsorption reaction at the acidic sites of the hydrocarbon trap, $\Delta H_Z$ is heat of adsorption of hydrocarbon at the non-acidic sites of the hydrocarbon trap, $\Delta H_{ZH}$ is heat of adsorption of hydrocarbon at the acidic sites of the hydrocarbon trap, R is the universal gas constant, and T is the temperature.

In another embodiment, the method further includes operating the exhaust heating unit when a net reaction rate of hydrocarbon desorption from the hydrocarbon trap is greater than zero, wherein the net reaction rate of hydrocarbon desorption from the hydrocarbon trap is determined based on the first reaction rate, the second reaction rate, the third reaction rate, and the fourth reaction rate.

In another embodiment, the exhaust heating unit is not operated when the net reaction rate of hydrocarbon desorption from the hydrocarbon trap is zero.

In another embodiment, the method further includes delivering the stream of air at the air injection port when a net reaction rate of hydrocarbon desorption from the hydrocarbon trap is greater than zero, wherein the net reaction rate of hydrocarbon desorption from the hydrocarbon trap is determined based on the first reaction rate, the second reaction rate, the third reaction rate, and the fourth reaction rate.

In another embodiment, in the method for treating an exhaust gas from an internal combustion engine in a motor vehicle, a quantity of air delivered at the air injection port is proportional to a calculated deficiency of oxygen at the second catalyst.

In another embodiment, in the method for treating an exhaust gas from an internal combustion engine in a motor vehicle, the stream of air is not delivered before the hydrocarbon trap reaches a hydrocarbon desorption temperature.

In another embodiment, in the method for treating an exhaust gas from an internal combustion engine in a motor vehicle, the stream of air is not delivered before the second catalyst reaches a hydrocarbon oxidation temperature.

In another embodiment, in the method for treating an exhaust gas from an internal combustion engine in a motor vehicle, the stream of air is not delivered when the net reaction rate of hydrocarbon desorption from the hydrocarbon trap is zero.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

For cold start hydrocarbon (HC) control, hydrocarbon traps (HCTs), such as those utilizing zeolites as hydrocarbon trapping components, have been investigated. In these systems, the molecular sieve zeolite component adsorbs and stores hydrocarbons during the start-up period and rapidly releases the stored hydrocarbons when the exhaust temperature is high enough to desorb hydrocarbons. The desorbed hydrocarbons are subsequently converted by a hydrocarbon oxidation catalyst, such as a three way catalyst (TWC) component downstream of the HCT. However, during a cold start, the HCTs may reach the hydrocarbon desorption (release) temperature before the TWC has reached a suitable temperature for HC oxidation, even when an exhaust heater (EH) is used to heat the TWC. As disclosed herein, the injection of air after a first catalyst and before a hydrocarbon trap according to a particular timing schedule provides a cooling effect on the HCT to delay the release of the hydrocarbons from the HCT, which allows for additional time for the EH to heat the TWC to a suitable operational temperature for hydrocarbon oxidation. The cooling effect of the injection of air before the HCT also may serve to maximize a temperature difference between the HCT and the second catalyst, thereby improving hydrocarbon oxidation efficiency.

The internal combustion engine generally represents any device capable of generating an exhaust gas stream comprising gaseous (e.g., $NO_x$, $CO_x$, $O_2$) and/or particulate matter species, and the disclosure herein should accordingly be interpreted as applicable to all such devices. As used herein, "exhaust gas" refers to any chemical species or mixture of chemical species which may require treatment, and includes gaseous, liquid, and/or solid species. For example, an exhaust gas stream may contain a mixture of one or more $NO_x$ species, one or more liquid hydrocarbon (HC) species, carbon dioxide, and/or carbon monoxide. It should be further understood that the embodiments disclosed herein may be applicable to treatment of effluent streams not comprising carbonaceous and/or particulate matter species. Exhaust gas particulate matter generally includes carbonaceous soot and other solid and/or liquid carbon-containing species.

Figure 1:
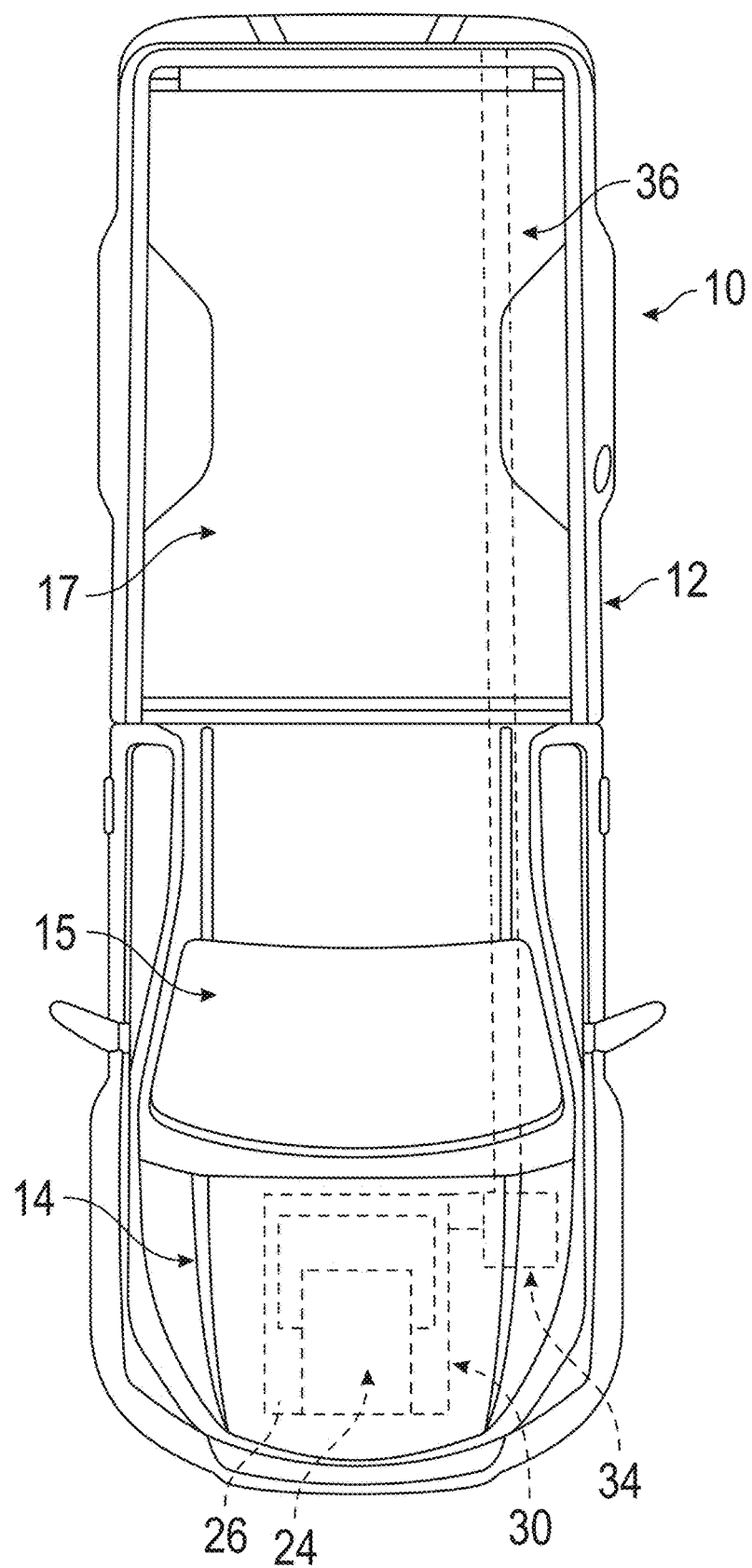
FIG. 1 illustrates a motor vehicle including an internal combustion engine and an emission control system according to one or more embodiments.

In accordance with an exemplary embodiment an exhaust gas treatment system for a motor vehicle is provided. In FIG. 1, a motor vehicle 10 is shown in the form of a pickup truck. It is to be understood that motor vehicle 10 may take on various forms including automobiles, commercial transports, marine vehicles, or the like. The motor vehicle 10 includes a body 12 having an engine compartment 14, and optionally a passenger compartment 15 and/or a cargo bed 17. Engine compartment 14 houses an internal combustion engine 24. The internal combustion engine 24 includes an exhaust system 30 that is fluidically connected to an exhaust gas treatment system 34. The internal combustion engine 24 may also be connected to other engine components 26. The exhaust produced by the internal combustion engine 24 passes through the exhaust gas treatment system 34 to reduce and/or convert emissions that may exit to the ambient atmosphere through an exhaust outlet pipe 36.

While the internal combustion engine 24 shown in FIG. 1 is shown as a sole main power source of the vehicle 10, it can also represent a second main engine source used together with another main power source as in a hybrid's electric motor.

Figure 2:
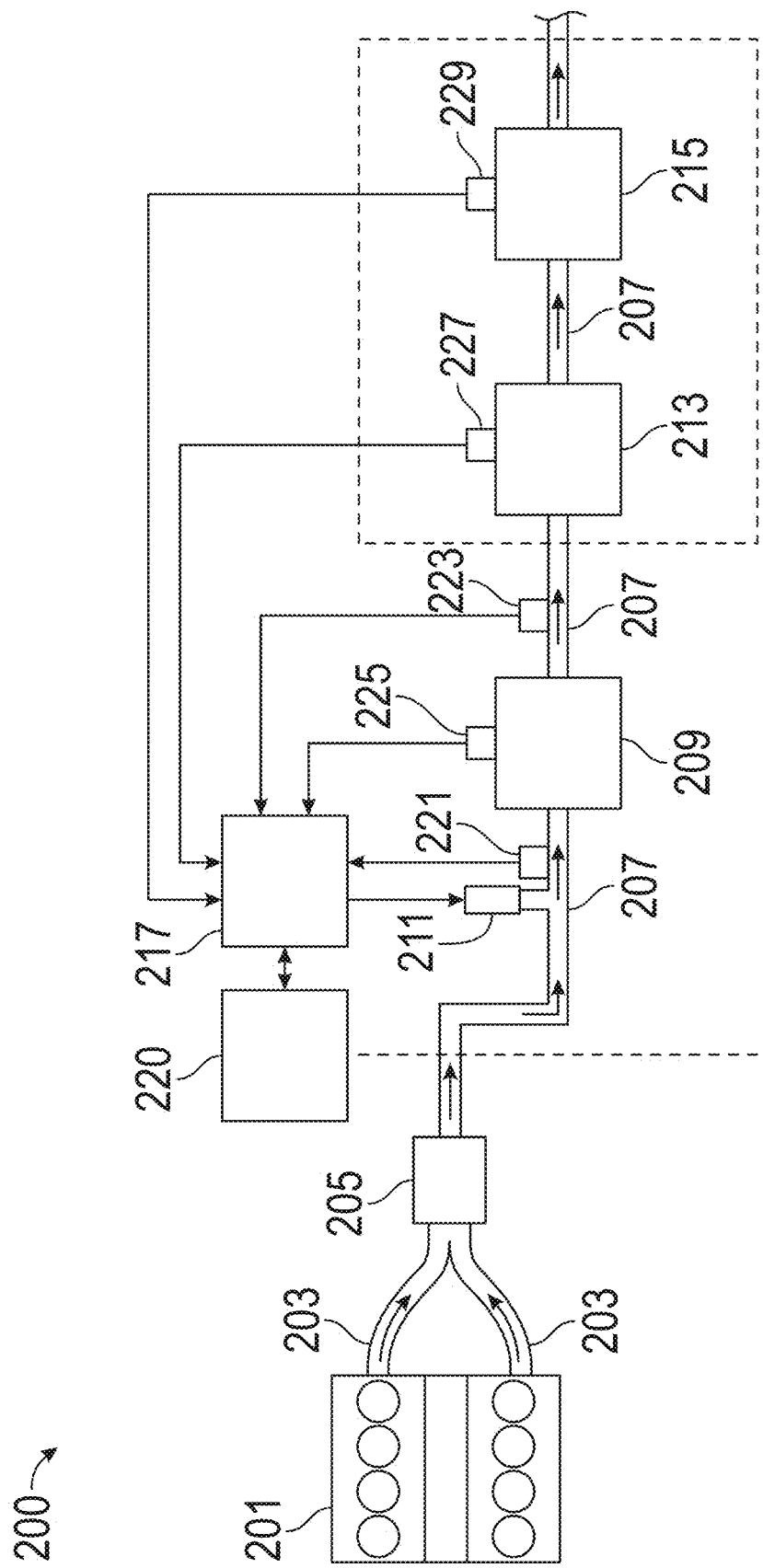
FIG. 2 is a schematic plan view of an exhaust gas treatment system according to one or more embodiments.

According to an aspect, and as shown in FIG. 2, provided is system 200 that includes an internal combustion engine 201 comprising an exhaust gas outlet 203, wherein the internal combustion engine 201 delivers an exhaust gas stream via the exhaust gas outlet 203. The internal combustion engine 201 may include one or more exhaust gas outlets 203. For example, FIG. 2 shows a pair of exhaust gas outlets 203 for conducting combustion gases from the internal combustion engine 201.

A first catalyst (e.g., a first three-way catalyst, or TWC) 205 is provided downstream of the exhaust gas outlet 203. The first catalyst 205 is in fluid communication with the exhaust gas outlet 203 to receive an exhaust output (exhaust gas stream) from the exhaust gas outlet 203 of the internal combustion engine 201.

The first catalyst 205 can be one of various flow-through catalyst devices capable of oxidizing CO and HCs as well as reducing $NO_x$. In some embodiments, the first catalyst 205 may include a flow-through metal or ceramic monolith substrate. The substrate may be packaged in a stainless steel shell or canister having an inlet in fluid communication with the exhaust gas outlet 203 and an outlet in fluid communication with an exhaust gas conduit 207. The substrate can include a catalyst compound disposed thereon. The catalyst compound may be applied as a washcoat and may contain platinum group metals such as platinum (Pt), palladium (Pd), rhodium (Rh), or other suitable oxidizing catalysts, or a combination thereof. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. In the first catalyst 205, the catalyst compositions for the oxidation and reduction functions can reside in discrete washcoat layers on the substrate or, alternatively, the compositions for the oxidation and reduction functions can reside in discrete longitudinal zones on the substrate.

The exhaust gas treatment system 200 includes a hydrocarbon trap (HCT) 209 located downstream of the first catalyst 205. The HCT 209 is in fluid communication with and receives an exhaust output from the first catalyst 205. For example, as noted herein, the first catalyst 205 may be in fluid communication with the HCT 209 via a segment of the exhaust gas conduit 207.

Suitable HCT storage materials for hydrocarbons include micro-porous solids, so-called molecular sieves, with zeolitic material representing a suitable micro-porous solid for HC trapping. Storage materials such as zeolitic (or zeotype) materials have a porosity suitable for storing or capturing hydrocarbons at least until a desired desorption temperature is reached. That is, the hydrocarbons are adsorbed while the exhaust gas is cold (for example during a cold start) and are desorbed when a higher exhaust-gas temperature is reached. Zeolites are microporous crystalline aluminosilicate materials characterized by well-ordered 3D structures with uniform pore/channel/cage structures of, for example, 3 to 12 Å or 3 to 10 Å (depending on framework type) and the ability to undergo ion exchange to enable the dispersion of catalytically active cations throughout the structure. Zeotypes are structural isotypes/isomorphs of zeolites and instead of a framework structure derived of linked silica and alumina tetrahedra, zeotypes are based upon, for example, alumina-phosphate (ALPO), silica-alumina-phosphate (SAPO), metal-alumina-phosphate (M-ALPO), or metal-silica-alumina-phosphate (M-APSO). Exemplary zeolitic materials include, for example, mordenite (MOR), Y-zeolites (FAU), ZSM-5 (MFI), β-zeolites (BEA), or combinations thereof. These are preferably used in H-form or $NH_4$-form being exchanged with transition metals.

The exhaust gas treatment system 200 includes an exhaust heating unit 213 located downstream of the HCT 209. The exhaust heating unit 213 is in fluid communication with and receives an exhaust output from the HCT 209. For example, as noted herein, the exhaust heating unit 213 may be in fluid communication with the HCT 209 via a segment of the exhaust gas conduit 207. Any suitable exhaust heating unit 213 may be used. For example, the exhaust heating unit 213 may be an electrical heater. If the vehicle is a conventional vehicle powered only by the internal combustion engine 201, then the exhaust heating unit 213 is powered by the engine 201 post-crank (i.e., post-crank heating after the engine 201 has started). If the vehicle is a hybrid vehicle powered by either the internal combustion engine 201 and/or a separate ICE/electric motor combination (not shown), then the exhaust heating unit 213 may be powered by either the engine 201 or the ICE/electric motor combination.

The exhaust gas treatment system 200 includes a second catalyst (e.g., a second TWC) 215 located downstream of the exhaust heating unit 213. The second catalyst 215 is in fluid communication with and receives an exhaust output from the exhaust heating unit 213. For example, as noted herein, the second catalyst 215 may be in fluid communication with the exhaust heating unit 213 via a segment of the exhaust gas conduit 207. The second catalyst 215 can be one of various flow-through catalyst devices capable of oxidizing CO and HCs as well as reducing $NO_x$, and any suitable catalyst may be used, such as those described herein for the first catalyst 205.

The exhaust gas treatment system 200 includes an air injection port 211 that is configured to selectively deliver a stream of air upstream of the HCT 209 and downstream of the first catalyst 205. The location of the air injection port 211 is not particularly limited. In some embodiments, the stream of air may be combined with the exhaust output from the first catalyst 205 at a location that is proximate to the outlet of the first catalyst 205. In other embodiments, the air injection port 211 may be located proximate to the inlet of the HCT 209.

The air injection source may be provided by an auxiliary pump, or may be tapped from the engine's compressor, with a valve and/or a choke nozzle. For vehicles with a turbocharger, the boost pressure and turbocharged air may be used as the source. In other embodiments, the air source may be from the crankcase using the energy generated therein to provide the air injection. In some embodiments, the air source may be a supercharger compressor or another air pumping device included with the engine.

A technical challenge associated with the use of an HCT 209 system is determining the status, or inventory level, of the HCT 209 unit and the rate, at which HCs are released from the HCT 209. In particular, the use of the electric heater and/or the air injection should be optimally tied to the status of the HCT unit (HC inventory) and the predicted release profile of the hydrocarbons as a function of time and temperature. The exhaust gas treatment system further includes a hydrocarbon storage model (shown as 220 in FIG. 2) and a controller 217 operably connected to the hydrocarbon storage model. The controller 217 is configured to execute a method for determining a hydrocarbon storage level of the HCT 209. The controller 217 may then activate or operate the HER 213, deliver the stream of air upstream of the HCT 209, or a combination thereof based on the hydrocarbon storage level of the HCT 209, as further detailed herein.

The method for determining the hydrocarbon storage level of the HCT 209 includes determining a first reaction rate representing a rate of hydrocarbon adsorption at non-acidic sites of the HCT 209; determining a second reaction rate representing a rate of hydrocarbon desorption at non-acidic sites of the HCT 209; determining a third reaction rate representing a rate of hydrocarbon adsorption at acidic sites of the HCT 209; determining a fourth reaction rate representing a rate of hydrocarbon desorption at acidic sites of the HCT 209; and determining the hydrocarbon storage level in the HCT 209 based on the first reaction rate, the second reaction rate, the third reaction rate, and the fourth reaction rate.

The determination of the first, second, third, and fourth reaction rates may use a dual site (acid/non-acidic sites) hydrocarbon trap modelling approach to determine the bulk adsorption and desorption behavior of the hydrocarbon species. The model assumes there are two major interactions between the HCT material and the hydrocarbon. The first is HC storage within, for example, the pores of the zeolite material, which are termed the non-acidic sites of the HCT material. The second is HC interaction with, for example, the Bronsted acid sites of the zeolite material, which are termed the acidic sites of the HCT material. Thus, the combination of first and third reaction rates provides the total adsorption of HC at the HCT material, whereas the combination of the second and fourth reaction rates provides the total desorption of HC at the HCT material.

The equilibrium reaction between the non-acidic sites (Z) of the HCT 209 and the hydrocarbon (HC) to form hydrocarbon-occupied sites (ZHC) may be expressed by the relationship:

Z+HC↔ZHC

Similarly, the equilibrium reaction between the acidic sites (ZH) of the HCT 209 and the hydrocarbon (HC) to form hydrocarbon-occupied sites (ZHHC) may be expressed by the relationship:

ZH+HC↔ZHHC

In one or more embodiments, the first reaction rate, which represents HC adsorption at the non-acidic sites the HCT, may be expressed by Equation 1:

$$r_{ads} = [HC]\theta_Z A_{1_Z} \exp\left(\frac{Ea_Z}{-RT}\right) \quad \text{(Equation 1)}$$

the second reaction rate, which represents HC desorption at the non-acidic sites of the HCT, may be expressed by Equation 2:

$$r_{des} = \theta_{ZHC} A_{-1_Z} \exp\left(\frac{Ea_Z + \Delta H_Z}{-RT}\right) \quad \text{(Equation 2)}$$

the third reaction rate, which represents HC adsorption at the acidic sites of the HCT, may be expressed by Equation 3:

$$r_{ads} = [HC]\theta_{ZH} A_{1_{ZH}} \exp\left(\frac{Ea_{ZH}}{-RT}\right) \quad \text{(Equation 3)}$$

the fourth reaction rate, which represents HC desorption at the acidic sites of the HCT, may be expressed by Equation 4:

$$r_{des} = \theta_{ZHHC} A_{-1_{ZH}} \exp\left(\frac{Ea_{ZH} + \Delta H_{ZH}}{-RT}\right) \quad \text{(Equation 4)}$$

In Equations 1 to 4, [HC] is a concentration of hydrocarbon through the HCT in mole per liter (mol/L, or in parts per million, ppm); $\theta_Z$ is site density of the non-acidic sites (Z) of the HCT that are not bound by hydrocarbon (0 to 1); $\theta_{ZHC}$ is site density of the non-acidic sites (ZHC) of the HCT that are bound by hydrocarbon (0 to 1); $\theta_{ZH}$ is site density of the acidic sites (ZH) of the HCT that are not bound by hydrocarbon (0 to 1); $\theta_{ZHHC}$ is site density of the acidic sites (ZHHC) of the HCT that are bound by hydrocarbon (0 to 1). The sum of $\theta_Z$ and $\theta_{ZHC}$ is 1, and the sum of $\theta_{ZH}$ and $\theta_{ZHHC}$ is 1. $A_{1_Z}$ is a pre-exponential factor of the non-acidic sites (Z) of the HCT for hydrocarbon adsorption; $A_{-1_Z}$ is a pre-exponential factor of the non-acidic sites (ZHC) of the HCT for hydrocarbon desorption; $A_{1_{ZH}}$ is a pre-exponential factor of the acidic sites (ZH) of the HCT for hydrocarbon adsorption; $A_{-1_{ZH}}$ is a pre-exponential factor of the acidic sites (ZHHC) of the HCT for hydrocarbon desorption; $Ea_z$ is activation energy of an adsorption reaction at the non-acidic sites (Z) of the HCT; $Ea_{zH}$ is activation energy of the adsorption reaction at the acidic sites (ZH) of the HCT; $\Delta H_Z$ is heat of adsorption of hydrocarbon at the non-acidic sites (Z) of the HCT in kilojoules per mole (KJ/mol); $\Delta H_{ZH}$ is heat of adsorption of hydrocarbon at the acidic sites (ZH) of the HCT in KJ/mol; R is the universal gas constant; and T is the temperature in Kelvin. It may be assumed that HC adsorption is not an activated process at either the non-acidic sites (Z) and acidic sites (ZH), such that the activation energy is zero. The equilibrium storage may be calculated by assuming that $r_{ads} = r_{des}$ for each of the non-acidic sites (Z) and acidic sites (ZH). Therefore, when $r_{ads} < r_{des}$, the HCT is desorbing HC. Note that Z and ZH are determined by the type of HCT material. In one or more embodiments, for each HC species, Equations 1 to 4 may be used to fit parameters for $\Delta_{Hz}$, $\Delta H_{zH}$, $A_{1_Z}$, $A_{-1_Z}$, $A_{1_{ZH}}$, and $A_{-1_{ZH}}$.

In some embodiments, the controller may be further configured to adjust an after treatment operation on hydrocarbon released by the hydrocarbon trap based on the hydrocarbon storage level, a net reaction rate of hydrocarbon desorption from the hydrocarbon trap, or a combination thereof. The net reaction rate of hydrocarbon desorption from the hydrocarbon trap may be determined based on the first reaction rate, the second reaction rate, the third reaction rate, and the fourth reaction rate. For example, the adjusting of the after treatment operation may include selectively operating the exhaust heating unit 213, selectively delivering a stream of air at the air injection port 211, or a combination thereof. For example, the control unit 217 may be configured to deliver the stream of air upstream of the HCT 209 after the HCT 209 stops adsorbing or capturing hydrocarbons and before the HCT 209 begins to desorb or release the hydrocarbons. In some embodiments, the control unit 217 may be configured to deliver the stream of air upstream of the HCT 209 while the HCT 209 desorbs the hydrocarbons. For example, in one or more embodiments, the control unit 217 may be configured to deliver the stream of air upstream of the HCT 209 after the HCT 209 stops adsorbing hydrocarbons and while the HCT 209 desorbs the hydrocarbons.

In some embodiments, the exhaust heating unit 213 may be selectively operated when a net reaction rate of hydrocarbon desorption from the HCT 209 is greater than zero, wherein the net reaction rate of hydrocarbon desorption from the HCT 209 may be determined based on the first reaction rate, the second reaction rate, the third reaction rate, and the fourth reaction rate. In some embodiments, the stream of air may be selectively delivered at the air injection port 211 when a net reaction rate of hydrocarbon desorption from the HCT 209 is greater than zero, wherein the net reaction rate of hydrocarbon desorption from the HCT 209 may be determined based on the first reaction rate, the second reaction rate, the third reaction rate, and the fourth reaction rate. In some embodiments, a quantity of air that is delivered at the air injection port 211 may be proportional to a calculated deficiency of oxygen at the second catalyst 215.

In some embodiments, the control unit 217 may be operably connected, via a number of sensors, to monitor the exhaust gas treatment system 200. The control unit may include a control module (not shown). As used herein, the term module refers to an application specific integrated circuit (ASIC), an electronic circuit, a processor (shared, dedicated, or group), and memory that executes one or more software or firmware programs, a combinational logic circuit, and/or other suitable components that provide the described functionality. Exemplary sensors include hydrocarbon sensors, oxygen sensors, temperature sensors, pressure sensors, or the like, or a combination thereof. The signal generated by a sensor can be transmitted to the control unit 217, and can be interpreted by the control unit 217, for example, for operation or adjustment of the exhaust gas treatment system 200.

In some embodiments, the exhaust gas treatment system 200 may include a first sensor 221 that is disposed upstream from the HCT 209 and downstream from the first catalyst 205. The first sensor 221 may be used, for example, to measure a concentration of one or more gases (e.g., oxygen, carbon dioxide, hydrocarbons, or the like, or a combination thereof) that are present in the exhaust gas conduit 207. The first sensor 221 may be used, for example, to measure a temperature and/or a pressure that is present in the exhaust gas conduit 207. For example, the first sensor 221 may be located proximate to the inlet of the HCT 209 to determine a concentration of gases, a temperature, and/or a pressure at the inlet of the HCT 209.

In some embodiments, the exhaust gas treatment system 200 may include a second sensor 223 that is disposed downstream from the HCT 209 and upstream from the exhaust heating unit 213. The second sensor 223 may be used, for example, to measure a concentration of one or more gases (e.g., oxygen, carbon dioxide, hydrocarbons, or the like, or a combination thereof) that are present in the exhaust gas conduit 207. The second sensor 223 may be used, for example, to measure a temperature and/or a pressure that is present in the exhaust gas conduit 207. For example, the second sensor 223 may be located proximate to the outlet of the HCT 209 to determine a concentration of gases, a temperature, and/or a pressure at the outlet of the HCT 209.

The control unit 217 is operably connected to the hydrocarbon storage model and is used to evaluate or determine a storage state of the HCT 209 based on the first reaction rate, the second reaction rate, the third reaction rate, and the fourth reaction rate. For example, the storage state of the HCT 209 may be evaluated based on time, temperature, and/or hydrocarbon concentration. In some embodiments, the storage state and/or the model may be adjusted based on the parameters that are measured (e.g., concentrations of gases, temperature, and/or pressure). For example, in some embodiments, the storage state may be further evaluated by comparing the concentrations of gases, temperature, and/or pressure at the inlet of the HCT 209 to the concentrations of gases, temperature, and/or pressure at the outlet of the HCT 209. In some embodiments, the storage state of the HCT 209 may be further evaluated based on timing of an engine event, such as the time elapsed from a cold start of an engine, or the like.

As used herein, the term "storage state" refers to the state of the hydrocarbon trap and may be an active state, an inactive state, or a release state. The term "active state" indicates that hydrocarbons are being stored (e.g., adsorbed) in the HCT 209, the term "release state" indicates that hydrocarbons are being released from the HCT 209, and the term "inactive state" indicates that the hydrocarbons are neither being stored nor being released at the HCT 209. For example, the active state may be indicated when the concentration of hydrocarbons at the inlet of the HCT 209 is determined to be greater than a concentration of hydrocarbons at an outlet of the HCT 209, the release state may be indicated when the concentration of hydrocarbons at the outlet of the HCT 209 is determined to be greater than the concentration of hydrocarbons at the inlet of the HCT 209, and the inactive state may be indicated when the concentration of hydrocarbons at the inlet of the HCT 209 is determined to be substantially the same as the concentration of hydrocarbons at the outlet of the HCT 209. The storage stage may be determined based on the hydrocarbon storage model and/or by using any number of parameters, such as gas concentrations, time, pressure, and/or temperature.

Additionally, one or more sensors may also be located in the various components of the exhaust gas treatment system 200. In some embodiments, the one or more sensors may include one or more temperature sensors 225, 227, 229 that are in contact with the components of the exhaust gas treatment system 200. For example, the exhaust gas treatment system 200 may include a first temperature sensor 225 that is configured to measure the temperature of the HCT 209, a second temperature sensor 227 that is configured to measure the temperature of the exhaust heating unit 213, and/or a third temperature sensor 229 that is configured to measure the temperature of the second catalyst 215. In some embodiments, a temperature signal generated by a temperature sensor can be transmitted to the control unit 217, and can be interpreted by the control unit 217 as needed for operation of the exhaust gas treatment system 200. The temperature sensors may be in fluid communication with the exhaust gas within the respective components, and/or may be a measurement of the component temperatures.

As noted above, the exhaust gas treatment system 200 can include an exhaust gas conduit 207, which may comprise several segments, for transporting the exhaust gas from the internal combustion engine 201 to the various exhaust treatment devices of the exhaust gas treatment system 200. For example, as illustrated, in FIG. 2, the exhaust gas treatment system 200 includes segments of an exhaust gas conduit 207 that fluidly connects the first catalyst 205, the HCT 209, the exhaust heating unit 213, and the second catalyst 215. The outlet of the second catalyst 215 may include a tailpipe that vents the treated exhaust gas to the ambient atmosphere.

Another aspect provides a method for treating an exhaust gas using the exhaust gas treatment system 200. The method includes operating the internal combustion engine 201 to provide an exhaust gas fluid (e.g., an exhaust gas stream) at the exhaust gas outlet 203. The exhaust gas fluid is conducted or transported through the exhaust gas treatment system 200, and through the first catalyst 205, the HCT 209, the exhaust heating unit 213, and the second catalyst 215. The exhaust gas treatment system 200 further includes the hydrocarbon storage model and the controller 217 that is operably connected to the hydrocarbon storage model. The controller 217 is configured to execute a method for determining a hydrocarbon storage level of the HCT 209, as noted above, by a method that includes determining a first reaction rate representing a rate of hydrocarbon adsorption at non-acidic sites of the HCT 209; determining a second reaction rate representing a rate of hydrocarbon desorption at non-acidic sites of the HCT 209; determining a third reaction rate representing a rate of hydrocarbon adsorption at acidic sites of the HCT 209; determining a fourth reaction rate representing a rate of hydrocarbon desorption at acidic sites of the HCT 209; and determining the hydrocarbon storage level in the HCT 209 based on the first reaction rate, the second reaction rate, the third reaction rate, and the fourth reaction rate.

In some embodiments of the method, the first reaction rate may be represented by Equation 1, the second reaction rate may be represented by Equation 2, the third reaction rate may be represented by Equation 3, and the fourth reaction rate may be represented by Equation 4 as provided herein.

In some embodiments, the method may further include adjusting an after treatment operation on hydrocarbon released by the HCT 209 based on the hydrocarbon storage level, a net reaction rate of hydrocarbon desorption from the HCT 209, or a combination thereof, wherein the net reaction rate of hydrocarbon desorption from the HCT 209 may be determined based on the first reaction rate, the second reaction rate, the third reaction rate, and the fourth reaction rate. For example, adjusting the after treatment operation may include selectively operating the exhaust heating unit 213, selectively delivering a stream of air at the air injection port 211, or a combination thereof.

In some embodiments, the exhaust heating unit 213 may be operated when a net reaction rate of hydrocarbon desorption from the HCT 209 is greater than zero, wherein the net reaction rate of hydrocarbon desorption from the HCT 209 is determined based on the first reaction rate, the second reaction rate, the third reaction rate, and the fourth reaction rate. For example, in some embodiments, the exhaust heating unit is not operated when the net reaction rate of hydrocarbon desorption from the HCT 209 is zero.

In some embodiments, the method may include delivering the stream of air at the air injection port 211 when a net reaction rate of hydrocarbon desorption from the HCT 209 is greater than zero, wherein the net reaction rate of hydrocarbon desorption from the HCT 209 is determined based on the first reaction rate, the second reaction rate, the third reaction rate, and the fourth reaction rate. The stream of air may be injected via the air injection port 211, as described herein. For example, the stream of air may be combined with the exhaust output from the first catalyst 205 at a location that is proximate to the outlet of the first catalyst 205. In other embodiments, the air injection port 211 may be located proximate to the inlet of the HCT 209.

In some embodiments, the method may include delivering the stream of air after the HCT 209 stops adsorbing hydrocarbons and before the HCT 209 begins to desorb the hydrocarbons. In some embodiments, the method may include delivering the stream of air after the HCT 209 stops adsorbing hydrocarbons and while the HCT 209 desorbs the hydrocarbons. In some aspects, the method may further include stopping the delivering of the stream of air after the HCT 209 stops desorbing the hydrocarbons. For example, in some embodiments, the stream of air is not delivered before the HCT 209 reaches a hydrocarbon desorption temperature. In some embodiments, the stream of air may not be delivered before the second catalyst 215 reaches a hydrocarbon oxidation temperature. In some embodiments, the stream of air may not be delivered when the net reaction rate of hydrocarbon desorption from the HCT 209 is zero.

The method may optionally include measuring a temperature, a gas concentration, a pressure, or a combination thereof using a first sensor 221 that is disposed upstream from the HCT 209 and downstream from the first catalyst 205.

In some embodiments, the method can further include selectively delivering the stream of air based on timing of an engine event, wherein the stream of air is delivered after the hydrocarbon trap stops adsorbing hydrocarbons and before the hydrocarbon trap begins to desorb the hydrocarbons. For example, the engine event may be measured from the cold start of an engine.

In some embodiments, the method can further include measuring a temperature, a gas concentration, a pressure, or a combination thereof using a second sensor 223 that is disposed downstream from the HCT 209 and upstream from the exhaust heating unit (HER) 213.

In some embodiments, the stream of air may be delivered at any suitable air mass flow rate. For example, the stream of air may be delivered at an air mass flow rate sufficient to provide a suitable temperature differential between a hydrocarbon release temperature at the HCT 209 and a hydrocarbon oxidation temperature at the catalyst 215. As used herein, the term "hydrocarbon release temperature" refers to a temperature at which hydrocarbons are released (e.g., desorbed) from the HCT 209. As used herein, the term "hydrocarbon oxidation temperature" refers to a temperature at which hydrocarbons are oxidized at the catalyst 215.

In one or more embodiments, the stream of air may be delivered at an air mass flow rate of 1 to 30 liters per second (L/s). For example, the stream of air may be delivered at an air mass flow rate of 2.5 to 30 L/s, or 5 to 25 L/s, but embodiments are not limited thereto. In some embodiments, the stream of air is delivered at an air mass flow rate sufficient to provide a suitable temperature differential, wherein the temperature differential is a difference between a temperature of the HCT 209 and a temperature of the second catalyst 215. In some embodiments, the stream of air is delivered at an air mass flow rate sufficient to provide a suitable temperature differential, wherein the temperature differential is a difference between a temperature of the HCT 209 and a temperature of the exhaust heating unit 213. In some embodiments, a method is provided for selecting the HCT material and selecting the catalyst material to maximize the temperature differential.

In some embodiments, the stream of air may be delivered at an air mass flow rate sufficient to provide a temperature differential of at least 10° C., at least 25° C., at least 50° C., at least 100° C., at least 150° C., at least 180° C., or at least 200° C., wherein the temperature differential is a difference between a temperature of the HCT 209 and a temperature of the second catalyst 215. In some embodiments, the stream of air may be delivered at an air mass flow rate sufficient to provide a temperature differential, of at least 10° C., at least 25° C., at least 50° C., at least 100° C., at least 150° C., at least 180° C., or at least 200° C., wherein the temperature differential is a difference between a temperature of the HCT 209 and a temperature of the exhaust heating unit 213.

Figure 3:
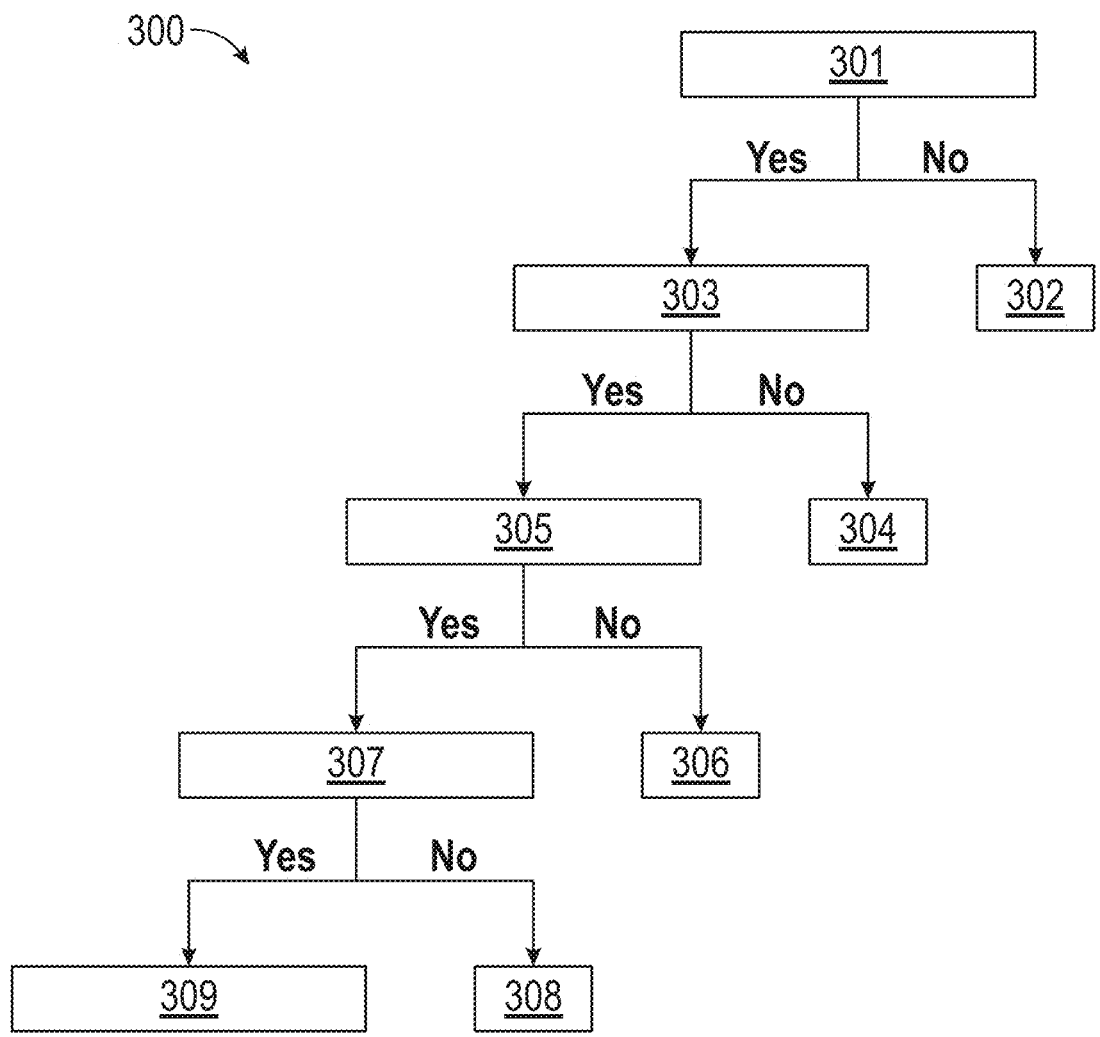
FIG. 3 illustrates a flowchart of an illustrative method according to one or more embodiments.

FIG. 3 depicts a flow diagram 300 illustrating a method for treating an exhaust gas from an internal combustion engine according to one or more embodiments. The flow diagram begins at block 301, where it is determined if the hydrocarbon trap has reached the hydrocarbon release temperature. If the hydrocarbon trap has not reached the release temperature, then proceed to block 302 and the air injection remains off. If the hydrocarbon trap has reached the release temperature, then proceed to block 303, where it is determined if the second catalyst has reached the oxidation temperature. If the second catalyst has not reached the oxidation temperature, then proceed to block 304 and the air injection remains off. If the second catalyst has reached the oxidation temperature, then proceed to block 305, where it is determined if the tailpipe EQR is greater than 1. If the tailpipe EQR is not greater than 1, then proceed to block 306 and the air injection remains off. If the tailpipe EQR is greater than 1, then proceed to block 307, where it is determined if the hydrocarbon release rate from the hydrocarbon trap is zero. If the hydrocarbon release rate from the hydrocarbon trap is zero, then proceed to block 309 and the air injection remains off. If the hydrocarbon release rate from the hydrocarbon trap is not zero, then proceed to block 308 and the air injection is on.

The term "EQR" refers to equivalence ratio, which is used to describe the air-to-fuel ratio in gasoline engines and after-treatment systems. An EQR of 1 means the combustion occurs under stoichiometric conditions where there is just enough air to combust all of the fuel, an EQR>1 means that more air than what is needed for stoichiometric combustion is present, which is also referred to as lean (or fuel lean) conditions. An EQR<1 means that less air than what is needed for stoichiometric combustion is present, which is also referred to as rich (or fuel rich) conditions.

Figure 4:
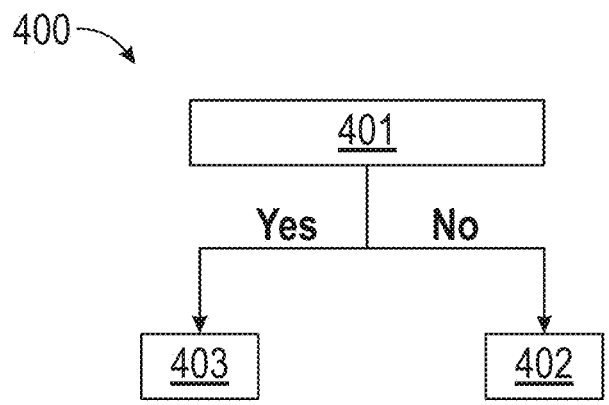
FIG. 4 illustrates a flowchart of an illustrative method according to one or more embodiments.

FIG. 4 depicts a flow diagram 400 illustrating a method for treating an exhaust gas from an internal combustion engine according to one or more embodiments. The flow diagram begins at block 401, where it is determined if the hydrocarbon release rate from the hydrocarbon trap is zero. If the hydrocarbon release rate from the hydrocarbon trap is zero, then proceed to block 403 and the electric heater is off. If the hydrocarbon release rate from the hydrocarbon trap is not zero, then proceed to block 402 and the electric heater is on.

Figure 5A:
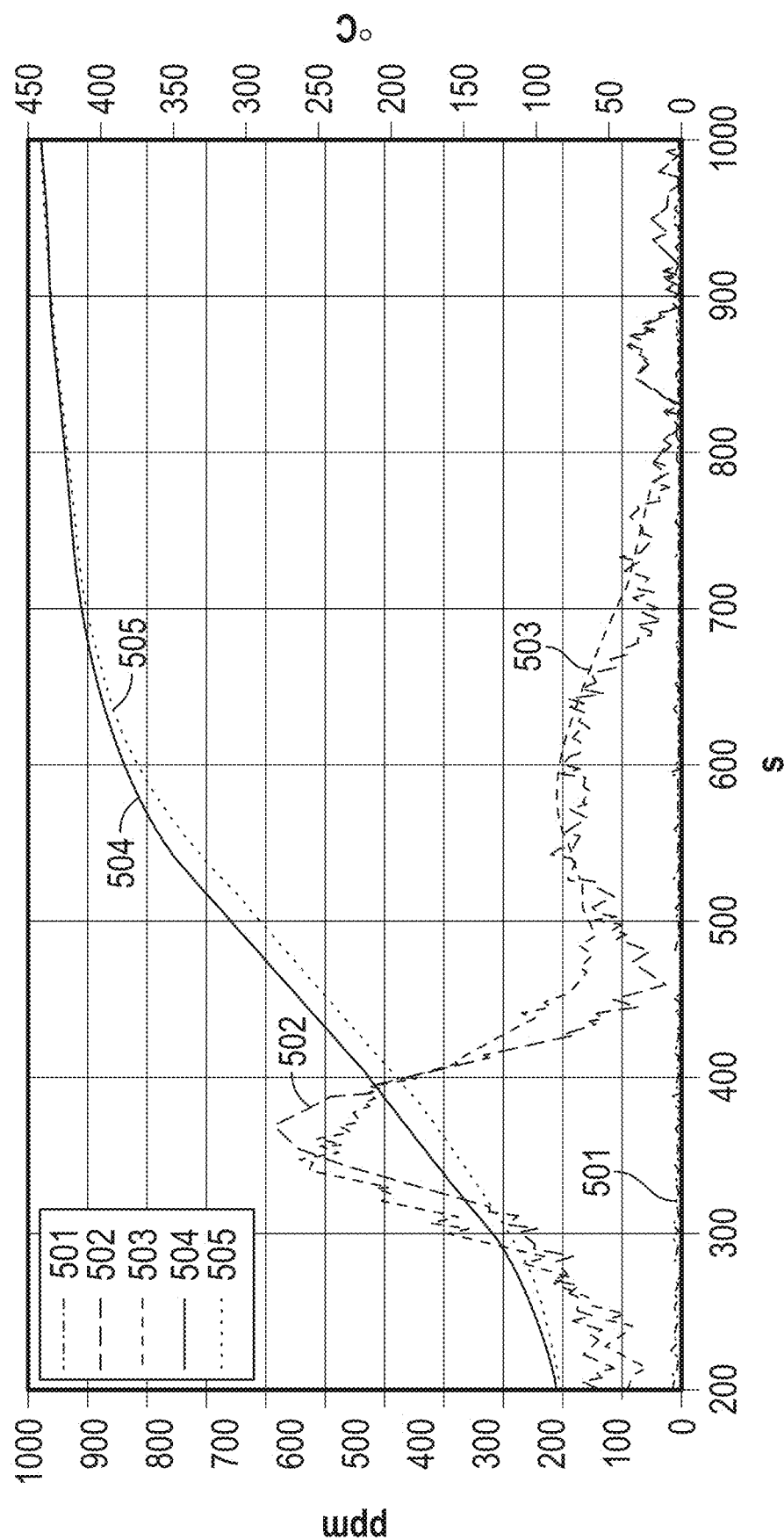
FIG. 5A is a graph of hydrocarbon (HC) concentration (parts per million, ppm) versus time (seconds, s) as measured at the inlet of a hydrocarbon trap and the outlet of a hydrocarbon trap, and of temperature (° C.) versus time(s) as measured at the inlet of the hydrocarbon trap and at the second catalyst according to one or more embodiments.
Figure 5B:
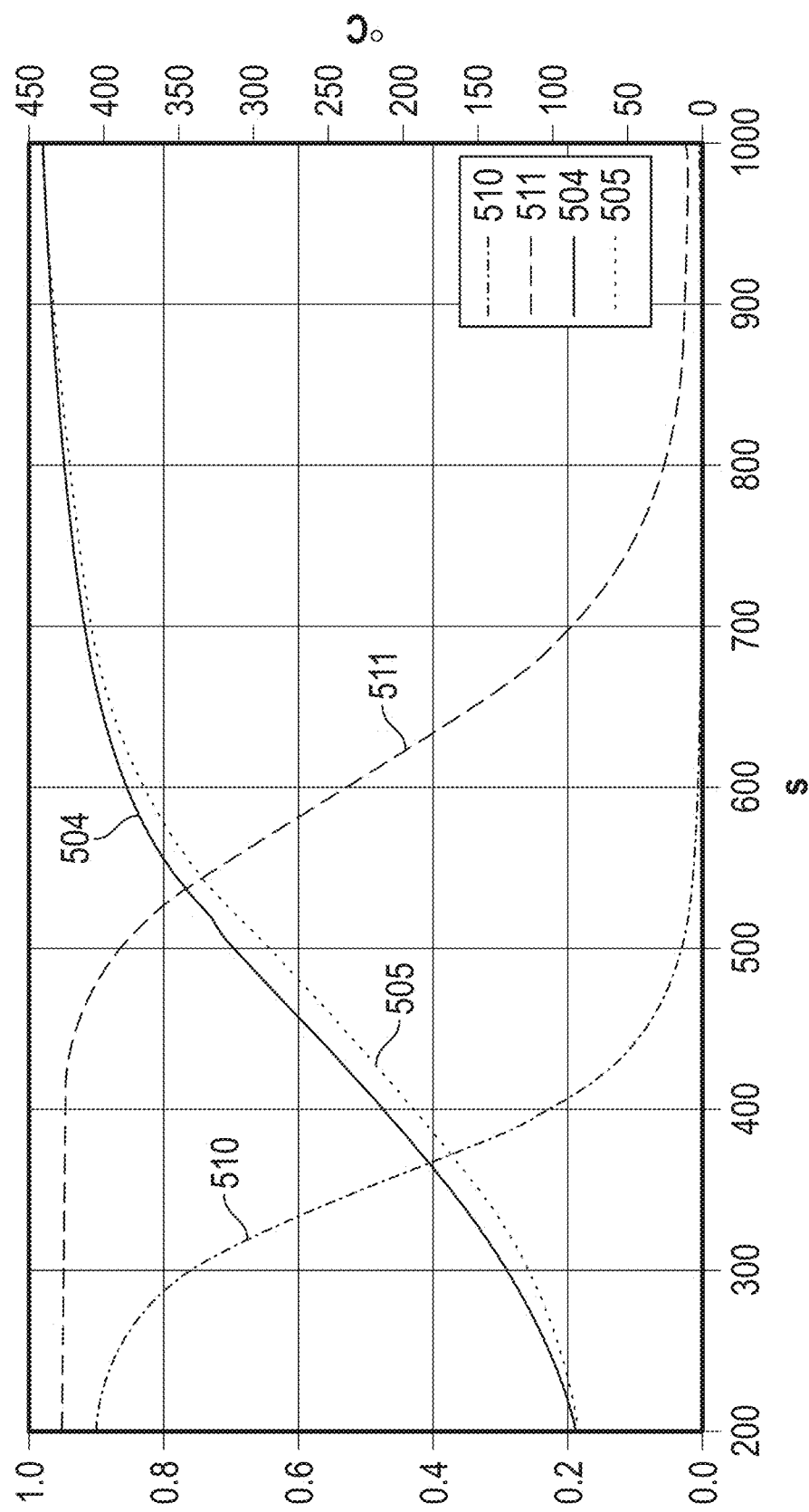
FIG. 5B is a graph of surface coverage of the hydrocarbon trap material versus time(s) as measured for the acidic sites and non-acidic sites of the hydrocarbon trap material, and of temperature (° C.) versus time(s) as measured at the inlet of the hydrocarbon trap and at the second catalyst according to one or more embodiments.

Referring now to FIG. 5A, a graph illustrates the $C_1$ hydrocarbon concentration (parts per million, ppm) measured at the inlet to the HCT unit (501), measured at the outlet of the HCT unit (502), and as calculated using Equations 1 to 4 based on time from engine cold start and temperature (503). The data was collected using a lab reactor model. The graph in FIG. 5A also shows the temperature at the HCT inlet (504) and the temperature at the second catalyst (505). In the period between about 300 seconds and about 450 seconds, there was a first release of hydrocarbons from the HCT unit, and then there was a second release of hydrocarbons from the HCT unit that was observed between about 475 second and about 700 seconds. Referring now to FIG. 5B, a graph illustrates the surface coverage (0 to 1) of the HCT material for each of the non-acidic sites that are occupied by hydrocarbon (510) and the acidic-sites that are occupied by hydrocarbon (511) based on time and temperature. The graph in FIG. 5B also shows the temperature at the HCT inlet (504) and the temperature at the second catalyst (505). The timeline in FIG. 5B corresponds to the timeline in FIG. 5A, and shows that first release of hydrocarbons from the HCT unit corresponds to the release of hydrocarbons from the non-acidic sites, whereas the second release of hydrocarbons from the HCT unit corresponds to the release of hydrocarbons from the acidic sites. For evaluation using Equations 1 to 4, the site density for Z was 2.5 mol/m$^3$, and for ZH was 1.2 mol/m$^3$; the heat of adsorption $DH_Z$ was 50.7 KJ/mol, and $DH_{ZH}$ was 67.2 KJ/mol; and the preexponential factors were $A_{1Z}$ 6.983E5; $A_{-1Z}$ 9.85E11; $A_{1ZH}$ 9.78E2; and $A_{-1ZH}$ 4.925E3.

The technical methods described herein facilitate improvements to emissions control systems used in combustion engines, such as those used in vehicles. The technical features described herein improve the conventional emissions control system by providing a control scheme based on capture and release of hydrocarbons by the hydrocarbon trap. Advantageously, the control scheme lowers emissions during cold starts.

In terms of hardware architecture, the emissions control system can be implemented in part using a computing device that can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software.

The memory can include any one or combination of volatile memory elements (e.g., random access memory (RAM, such as DRAM, SRAM, SDRAM, VRAM, etc.)) and/or nonvolatile memory elements (e.g., ROM, hard drive, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

One should note that FIG. 3 shows an architecture, functionality, and/or operation scheme that can be implemented in part using software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

The terms "a" and "an" do not denote a limitation of quantity, but rather denote the presence of at least one of the referenced items. The term "or" means "and/or" unless clearly indicated otherwise by context. Reference throughout the specification to "an aspect," means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears. Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure is not limited to the particular embodiments disclosed, but will include all embodiments falling within the scope thereof.

What is claimed is:

1. An exhaust gas treatment system, comprising:
a first catalyst downstream of an exhaust gas outlet of an internal combustion engine, wherein the first catalyst receives an exhaust output from the exhaust gas outlet;
a hydrocarbon trap downstream of the first catalyst, wherein the hydrocarbon trap receives an exhaust output from the first catalyst;
an air injection port configured to deliver a stream of air upstream of the hydrocarbon trap and downstream of the first catalyst;
an exhaust heating unit downstream of the hydrocarbon trap, wherein the exhaust heating unit receives an exhaust output from the hydrocarbon trap;
a second catalyst downstream of the exhaust heating unit, wherein the second catalyst receives an exhaust output from the exhaust heating unit;
a hydrocarbon storage model stored in memory; and
a controller operably connected to the hydrocarbon storage model and the memory, the controller configured to execute a method for determining a hydrocarbon storage level of the hydrocarbon trap, the method comprising controller configured to:
determine a first reaction rate representing a rate of hydrocarbon adsorption at non-acidic sites of the hydrocarbon trap;
determine a second reaction rate representing a rate of hydrocarbon desorption at non-acidic sites of the hydrocarbon trap;
determine a third reaction rate representing a rate of hydrocarbon adsorption at acidic sites of the hydrocarbon trap;
determine a fourth reaction rate representing a rate of hydrocarbon desorption at acidic sites of the hydrocarbon trap; and
determine the hydrocarbon storage level in the hydrocarbon trap based on the first reaction rate, the second reaction rate, the third reaction rate, and the fourth reaction rate,
wherein the controller is further configured to adjust an after treatment operation on hydrocarbon released by the hydrocarbon trap based on the hydrocarbon storage level, a net reaction rate of hydrocarbon desorption from the hydrocarbon trap, or a combination thereof, wherein the net reaction rate of hydrocarbon desorption from the hydrocarbon trap is determined based on the first reaction rate, the second reaction rate, the third reaction rate, and the fourth reaction rate, and
wherein the adjusting the after treatment operation comprises selectively operating the exhaust heating unit, selectively delivering a stream of air at the air injection port, or a combination thereof.

2. The exhaust gas treatment system of claim 1, further comprising a first temperature sensor for determining temperature of the hydrocarbon trap.

3. The exhaust gas treatment system of claim 1, further comprising a second temperature sensor for determining temperature of the second catalyst.

4. The exhaust gas treatment system of claim 1, wherein the first reaction rate is represented by Equation 1:

$$r_{ads} = [HC]\theta_Z A_{1_Z} \exp\left(\frac{Ea_Z}{-RT}\right) \quad \text{(Equation 1)}$$

the second reaction rate is represented by Equation 2:

$$r_{des} = \theta_{ZHC} A_{-1_Z} \exp\left(\frac{Ea_Z + \Delta H_Z}{-RT}\right) \quad \text{(Equation 2)}$$

the third reaction rate is represented by Equation 3:

$$r_{ads} = [HC]\theta_{ZH} A_{1_{ZH}} \exp\left(\frac{Ea_{ZH}}{-RT}\right) \quad \text{(Equation 3)}$$

the fourth reaction rate is represented by Equation 4:

$$r_{des} = \theta_{ZHHC} A_{-1_{ZH}} \exp\left(\frac{Ea_{ZH} + \Delta H_{ZH}}{-RT}\right) \quad \text{(Equation 4)}$$

wherein, in Equations 1 to 4,

[HC] is a concentration of hydrocarbon through the hydrocarbon trap, $\theta_Z$ is site density of the non-acidic sites of the hydrocarbon trap that are not bound by hydrocarbon, $\theta_{ZHC}$ is site density of the non-acidic sites of the hydrocarbon trap that are bound by hydrocarbon, $\theta_{ZH}$ is site density of the acidic sites of the hydrocarbon trap that are not bound by hydrocarbon, $\theta_{ZHHC}$ is site density of the acidic sites of the hydrocarbon trap that are bound by hydrocarbon, $A_{1Z}$ is a pre-exponential factor of the non-acidic sites of the hydrocarbon trap for hydrocarbon adsorption, $A_{-1Z}$ is a pre-exponential factor of the non-acidic sites of the hydrocarbon trap for hydrocarbon desorption, $A_{1ZH}$ is a pre-exponential factor of the acidic sites of the hydrocarbon trap for hydrocarbon adsorption, $A_{-1ZH}$ is a pre-exponential factor of the acidic sites of the hydrocarbon trap for hydrocarbon desorption, $Ea_z$ is activation energy of an adsorption reaction at the non-acidic sites of the hydrocarbon trap, $Ea_{zH}$ is activation energy of the adsorption reaction at the acidic sites of the hydrocarbon trap, $\Delta H_Z$ is heat of adsorption of hydrocarbon at the non-acidic sites of the hydrocarbon trap, $\Delta H_{ZH}$ is heat of adsorption of hydrocarbon at the acidic sites of the hydrocarbon trap, R is the universal gas constant, and T is the temperature.

5. The exhaust gas treatment system of claim 4, wherein the controller is further configured to selectively operate the exhaust heating unit when a net reaction rate of hydrocarbon desorption from the hydrocarbon trap is greater than zero, wherein the net reaction rate of hydrocarbon desorption from the hydrocarbon trap is determined based on the first reaction rate, the second reaction rate, the third reaction rate, and the fourth reaction rate.

6. The exhaust gas treatment system of claim 4, wherein the controller is further configured to selectively deliver the stream of air at the air injection port when a net reaction rate of hydrocarbon desorption from the hydrocarbon trap is greater than zero, wherein the net reaction rate of hydrocarbon desorption from the hydrocarbon trap is determined based on the first reaction rate, the second reaction rate, the third reaction rate, and the fourth reaction rate.

7. The exhaust gas treatment system of claim 6, wherein a quantity of air delivered at the air injection port is proportional to a calculated deficiency of oxygen at the second catalyst.

8. A method for treating an exhaust gas from an internal combustion engine in a motor vehicle, the method comprising:

operating the internal combustion engine to provide an exhaust gas fluid at an exhaust gas outlet of the internal combustion engine;

conducting the exhaust gas fluid through an exhaust gas treatment system comprising:

a first catalyst downstream of the exhaust gas outlet of the internal combustion engine, wherein the first catalyst receives an exhaust output from the exhaust gas outlet;

a hydrocarbon trap downstream of the first catalyst, wherein the hydrocarbon trap receives an exhaust output from the first catalyst;

an air injection port configured to deliver a stream of air upstream of the hydrocarbon trap and downstream of the first catalyst;

an exhaust heating unit downstream of the hydrocarbon trap, wherein the exhaust heating unit receives an exhaust output from the hydrocarbon trap;

a second catalyst downstream of the exhaust heating unit, wherein the second catalyst receives an exhaust output from the exhaust heating unit;

a hydrocarbon storage model stored in memory; and a controller operably connected to the hydrocarbon storage model and the memory, the controller configured to execute a method for determining a hydrocarbon storage level of the hydrocarbon trap;

determining via the controller a first reaction rate representing a rate of hydrocarbon adsorption at non-acidic sites of the hydrocarbon trap;

determining via the controller a second reaction rate representing a rate of hydrocarbon desorption at non-acidic sites of the hydrocarbon trap;

determining via the controller a third reaction rate representing a rate of hydrocarbon adsorption at acidic sites of the hydrocarbon trap;

determining via the controller a fourth reaction rate representing a rate of hydrocarbon desorption at acidic sites of the hydrocarbon trap; and determining via the controller the hydrocarbon storage level in the hydrocarbon trap based on the first reaction rate, the second reaction rate, the third reaction rate, and the fourth reaction rate, further comprising adjusting an after treatment operation on hydrocarbon released by the hydrocarbon trap based on the hydrocarbon storage level, a net reaction rate of hydrocarbon desorption from the hydrocarbon trap, or a combination thereof, wherein the net reaction rate of hydrocarbon desorption from the hydrocarbon trap is determined based on the first reaction rate, the second reaction rate, the third reaction rate, and the fourth reaction rate, wherein the adjusting the after treatment operation comprises selectively operating the exhaust heating unit, selectively delivering a stream of air at the air injection port, or a combination thereof.

9. The method of claim 8, wherein the first reaction rate is represented by Equation 1:

$$r_{ads} = [HC]\theta_Z A_{1_Z} \exp\left(\frac{Ea_Z}{-RT}\right) \quad \text{(Equation 1)}$$

the second reaction rate is represented by Equation 2:

$$r_{des} = \theta_{ZHC} A_{-1_Z} \exp\left(\frac{Ea_Z + \Delta H_Z}{-RT}\right) \quad \text{(Equation 2)}$$

the third reaction rate is represented by Equation 3:

$$r_{ads} = [HC]\theta_{ZH} A_{1_{ZH}} \exp\left(\frac{Ea_{ZH}}{-RT}\right) \quad \text{(Equation 3)}$$

the fourth reaction rate is represented by Equation 4:

$$r_{des} = \theta_{ZHHC} A_{-1_{ZH}} \exp\left(\frac{Ea_{ZH} + \Delta H_{ZH}}{-RT}\right) \quad \text{(Equation 4)}$$

wherein, in Equations 1 to 4,

[HC] is a concentration of hydrocarbon through the hydrocarbon trap, $\theta_Z$ is site density of the non-acidic sites of the hydrocarbon trap that are not bound by hydrocarbon, $\theta_{ZHC}$ is site density of the non-acidic sites of the hydrocarbon trap that are bound by hydrocarbon, $\theta_{ZH}$ is site density of the acidic sites of the hydrocarbon trap that are not bound by hydrocarbon, $\theta_{ZHHC}$ is site density of the acidic sites of the hydrocarbon trap that are bound by hydrocarbon, $A_{1_Z}$ is a pre-exponential factor of the non-acidic sites of the hydrocarbon trap for hydrocarbon adsorption, $A_{-1_Z}$ is a pre-exponential factor of the non-acidic sites of the hydrocarbon trap for hydrocarbon desorption, $A_{1_{ZH}}$ is a pre-exponential factor of the acidic sites of the hydrocarbon trap for hydrocarbon adsorption, $A_{-1_{ZH}}$ is a pre-exponential factor of the acidic sites of the hydrocarbon trap for hydrocarbon desorption, $Ea_z$ is activation energy of an adsorption reaction at the non-acidic sites of the hydrocarbon trap, $Ea_{zH}$ is activation energy of the adsorption reaction at the acidic sites of the hydrocarbon trap, $\Delta H_Z$ is heat of adsorption of hydrocarbon at the non-acidic sites of the hydrocarbon trap, $\Delta H_{ZH}$ is heat of adsorption of hydrocarbon at the acidic sites of the hydrocarbon trap, R is the universal gas constant, and T is the temperature.

10. The method of claim 9, further comprising operating the exhaust heating unit when a net reaction rate of hydrocarbon desorption from the hydrocarbon trap is greater than zero, wherein the net reaction rate of hydrocarbon desorption from the hydrocarbon trap is determined based on the first reaction rate, the second reaction rate, the third reaction rate, and the fourth reaction rate.

11. The method of claim 10, wherein the exhaust heating unit is not operated when the net reaction rate of hydrocarbon desorption from the hydrocarbon trap is zero.

12. The method of claim 9, further comprising delivering the stream of air at the air injection port when a net reaction rate of hydrocarbon desorption from the hydrocarbon trap is greater than zero, wherein the net reaction rate of hydrocarbon desorption from the hydrocarbon trap is determined based on the first reaction rate, the second reaction rate, the third reaction rate, and the fourth reaction rate.

13. The method of claim 12, wherein a quantity of air delivered at the air injection port is proportional to a calculated deficiency of oxygen at the second catalyst.

14. The method of claim 12, wherein the stream of air is not delivered before the hydrocarbon trap reaches a hydrocarbon desorption temperature.

15. The method of claim 12, wherein the stream of air is not delivered before the second catalyst reaches a hydrocarbon oxidation temperature.

16. The method of claim 10, wherein the stream of air is not delivered when the net reaction rate of hydrocarbon desorption from the hydrocarbon trap is zero.

* * * * *